United States Patent [19]

Wood

[11] Patent Number: 4,643,467
[45] Date of Patent: Feb. 17, 1987

[54] THREADED TUBING SEALS

[76] Inventor: Kenneth M. Wood, 209 Estate Dr., Houma, La. 70360

[21] Appl. No.: 401,300

[22] Filed: Jul. 23, 1982

[51] Int. Cl.⁴ ............................................. F16L 25/00
[52] U.S. Cl. ..................................... 285/334; 285/351
[58] Field of Search .................. 285/334, 332.2, 332.3, 285/333, 355, 351

[56] References Cited

U.S. PATENT DOCUMENTS

| | | | |
|---|---|---|---|
| 2,102,072 | 12/1937 | Hinderliter | 285/333 X |
| 2,239,942 | 4/1939 | Stone et al. | 285/334 X |
| 3,266,821 | 8/1966 | Safford | 285/332.2 X |
| 3,359,013 | 12/1967 | Knox et al. | 285/334 X |
| 3,427,050 | 2/1969 | Krieg | 285/332.2 X |
| 3,508,771 | 4/1970 | Duret | 285/334 |
| 3,572,777 | 3/1971 | Blose | 285/33 A |
| 3,870,351 | 3/1975 | Mutsuki | 285/334 |

FOREIGN PATENT DOCUMENTS 1300262 6/1952 France ............................... 285/334

Primary Examiner—Dave W. Arola
Attorney, Agent, or Firm—James c. Wray

[57] ABSTRACT

Male and female tubing or pipe ends have tapered thread with a sealing profile and a shoulder seal. A tapered end on the male tube cooperates with a tapered plastic compression seal at an internal shoulder in the female end. A modification has a tapered seat seal with complementary tapers at the end of the male connection and in the innermost part of the female connection. A plastic self-energized O-ring seal is positioned partly within an annular recess at the large end of the tapered seat in the female part.

1 Claim, 2 Drawing Figures

THREADED TUBING SEALS

BACKGROUND OF THE INVENTION

This invention relates to tubing having threaded ends with multiple seals.

Prior art United States patents are officially referenced and cross-referenced in Class 285, Pipe Joints or Couplings, subclasses 333, Threaded Drill Pipe Types, and 334, Similar Types Having Flat Crest Threads. Examples of patents found there are:

| | |
|---|---|
| 3,100,656 | 3,822,902 |
| 3,508,771 | 2,102,072 |
| 3,658,368 | 2,111,627 |
| 4,085,951 | 3,167,333 |
| 2,104,799 | 2,181,343 |
| 3,687,493 | 4,244,607 |

U.S. Pat. No. 3,100,656, describes a threaded tubing joint with a shoulder seal, a tapered seat seal has an inward recess holding a plastic ring which is axially compressed.

U.S. Pat. No. 3,508,771 shows a tapered pipe joint with a shoulder seal 9, 10 and tapered seat seal 11 and a sealing ring between threads and a seat seal. The sealing ring 8 does not have a round cross-section. The threads may have a sealing profile as shown in FIGS. 5 and 6.

The seal receiving groove 21 in the inner tapered surface shown in FIG. 2 is of interest in U.S. Pat. No. 3,658,368.

The annular sealing ring 24 in U.S. Pat. No. 4,058,951 is of interest, but the ring has a generally square cross-section as shown in FIGS. 6, 7 and 8.

U.S. Pat. Nos. 2,104,799, 3,687,493 and 3,822,902 show sealing rings having round cross-sections.

Sealing rings as shown in U.S. Pat. Nos. 2,102,072, 2,111,627 and 3,167,333 are axially compressed.

U.S. Pat. Nos. 2,181,343 and 4,244,607 have thread configurations of interest.

The threaded tubing may be used in conditions of substantial pressure differentials between the inside and outside of the tubing and may be used in situations where it is undesirable to permit combination of fluids between the inside and outside of the tubing. Fluids in or around the threaded tubing may have propensities to move around conventionally sealed tubing.

A need persists for threaded tubing having multiple seals which complement each other and prevent communications of fluids between inside and outside of the tubing.

SUMMARY OF THE INVENTION

The present invention overcomes existing problems of the prior art by providing new tubing having multiple seals which complement each other to prevent communication of fluid between an inside and an outside of the pipe.

In preferred embodiments the tubes have three and four major seals which augment each other.

One of the principal seals is threads having sealing profiles. Both male and female threads have generally radial surfaces on sides facing inward along the tubes. Sides of the sealing profile threads facing outward along the tubes are sloped to provide ease in connecting movement. In preferred embodiments, the threads are tapered to facilitate assembly and to ensure complete assembly and sealing contact of all of the threads.

The second primary seal is a shoulder seal which is made between an outward and rearward sloping distal surface of a female portion and a complementary outward and forward sloping surface of the male portion. When the tubing sections are fitted together the two sloping surfaces tightly abut each other, forming the external shoulder seal.

A third primary seal is a tapered seat seal which is formed between a sloping surface on the distal end of the male threaded portion and a complementary sloping surface at the proximal end of the female threaded portion.

In one preferred embodiment the sloping surface within the female portion is provided by an elastomeric compression seal which has a first part with radial surfaces and which compresses between radial surfaces at the distal end of the male portion and at the proximal end of the female portion. The compression seal has a second portion with a sloping surface which presses against the sloping surface at the distal end of the male portion. The compression seal provides sealing by virtue of axial compression between the radial surfaces and sealing by means of radial compression and additional axial compression by sealing with the sloping surface at the distal end of the male portion.

In one preferred embodiment of the invention a recess is provided in an axial surface in a proximal portion of the female section. A self-energizing seal is positioned in the recess and is compressed between walls of the recess and an axial surface of a distal portion of the male section to provide a further seal.

This invention provides tubing apparatus for interconnection and sealing of male and female tubing ends. A cylindrical wall has first and second ends and first and second end portions which extend inward along the cylindrical wall from the first and second ends.

The first and second end portions respectively have male connection and sealing portions and female connection and sealing portions. The male connection and sealing portion includes tapered threads beginning at a position spaced inward from the first end and extending to a second position further spaced inward from the first end. The tapered male threads have a minimum diameter near the first position and a maximum diameter near the second position. The tapered threads have generally sloped surfaces on sides thereof facing the first end and have generally radial surfaces on sides thereof facing away from the first end, thereby forming sealing profiles of the first male thread.

An axial outer surface extends along the tubing from the second position. A shoulder extends outward from that axial extending surface remote from the second position. The shoulder slopes outward and toward the first end for forming one part of a shoulder seal.

A second axial surface has a diameter smaller than a diameter of the first axial surface. The second axial surface extends from the first position toward the first end. An outward sloping surface extends from the first end to the second axial surface.

A female portion has female threads extending from a third position spaced from the second end to a fourth position further spaced from the second end. The female thread has a maximum dimension near the third, outer, position and a minimum dimension near the fourth, inner, position. The female thread has sloping surfaces facing the second end and has generally radial surfaces facing away from the second end, thereby forming sealing profiles.

A third axial surface extends inward from the fourth position away from the second end, and an inner shoulder extends toward an axis of the tubing from an innermost position of the female portion. A fourth axial surface extends from the third position to a terminal sloping surface at the second end. The terminal sloping surface has a slope to lie against the shoulder on the male portion when the threads are interconnected and tightened and the fourth axial surface overlies the first axial surface.

The third axial surface has inner sealing means for cooperating with a surface near the first end to provide an additional seal.

The inner cylindrical surface of the tube extends from the first end to the inner shoulder, and the outer cylindrical surface extends from the terminal surface at the second end to the shoulder on the male portion.

In one embodiment the sealing means is an annular compression seal having a radial surface for abutting the inner shoulder and having an outer axial surface for lying against the third axial surface in the female portion. The compression seal has an inner axial portion for receiving the first end of the tubing in sealing relation and has a sloping surface extending outward from the inner axial surface for receiving the outward sloping surface at the first end of the tubing in sealing relation. The compression seal is compressed axially between the inner shoulder and the first end of the tubing, and the compression seal is compressed radially between the outward sloping surface near the first end of the tubing and the axial surface in the female portion of the tubing.

In one preferred embodiment the sealing means includes a recess in the third axial surface between the third position and the inner shoulder. The recess has an axial surface spaced radially outward from the third axial surface and first and second radial recess surfaces extending between the third axial surface and the axial recess surface. An annular self-energizing seal is positioned in the recess and extends from the recess inward beyond the third axial surface. The self-energizing seal is compressed between the axial recess surface, and the second axial surface of the male portion and is compressed against at least one of the radial recess surfaces, thereby forming a seal. An inward sloping surface extends between the recess and the inner shoulder for receiving the outward sloping surface at the first end of the tubing to form a further tapered seat seal.

These and further and other objects of the invention are apparent and the disclosure which includes the specification with the above and ongoing description and the claims and the drawings.

DETAILED DESCRIPTION OF THE DRAWINGS

Figure 1:
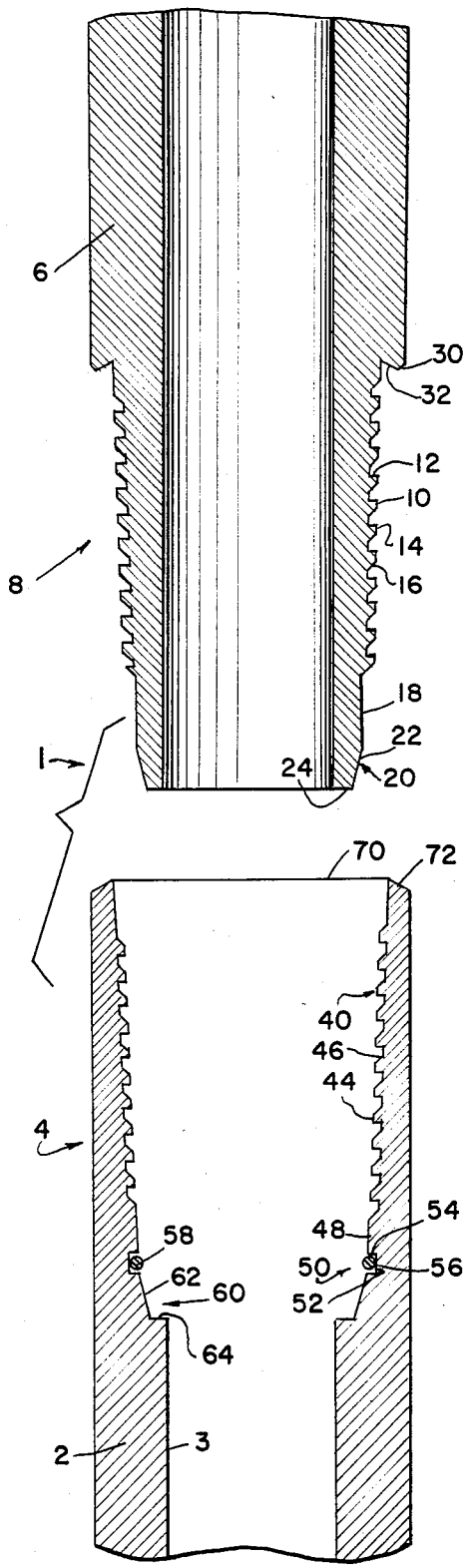
FIG. 1 is a cross-section of tubing connecting and sealing elements.

Referring to the drawings, the numeral 1 refers to the connecting and sealing portions of tubing.

The tubing has a cylindrical wall 3 with cylindrical inner and outer surfaces. One end 2 of the tubing has a female connecting and sealing portion generally indicated by numeral 4. Another end 6 of the tubing has a male connecting and sealing portion generally referred to by the numeral 8. The male portion in a preferred embodiment has a tapered thread 10 with a sealing profile. The threads 10 have generally radial surfaces 12 facing inward toward the tubing and have generally flat tapered crests 14. Thread surfaces 16 which face outward toward the end of the connecting portion are sloped to provide ease in assembly and to ensure full thread along the thread. An axial portion 18 extends axially outward from the thread 10 to the tapered seat seal, generally indicated by the number 20. The tapered seat seal 20 includes a sloping surface 22 which slopes inward from the distal end of the axial surface 18 which terminates in the radial surface 24 of the first end of the tubing.

A shoulder seal generally indicated by the numeral 30 has an inward and rearward sloping surface 32 near the proximal or inward end of the male connecting and sealing portion.

As shown in the lower half of FIG. 1, the female connecting and sealing portion 4 has a complementary tapered sealing profile thread 40. The thread has generally radial inward facing and sealing surfaces 42, flat crests 44 which are connically tapered and sloping outward surfaces 46 to facilitate assembly.

Axial surface 48 surrounds the axial surface 18.

A fourth seal is generally indicated by the numeral 50. The seal 50 includes a recess 52 in the axial surface 48 with radial walls 54 extending from the axial surface 48 outward to axial surface 56. Self-energizing O-ring seal 58 is positioned partially within recess 52. The self-energizing seal may be made of any suitable elastomeric material and is preferably made of synthetic plastic material having qualities of resilience and resistance to attack by fluids encountered on the inside or the outside of the tubing. Self-energizing seal 58 is compressed by the axial surface 18 and substantially fills the recess 52, forming compressed seal between axial surfaces 18 and 56 and against at least one of the radial surfaces 54.

A tapered seat seal generally indicated by the numeral 60 in the female portion 4 cooperates with the tapered seat seal 20 on the male portion 8 to provide a further seal. Sloping surface 62 surrounds and lies against surface 22 when the tubing sections are drawn tight by the threads 10 and 40. At that time, axial surface 54 abuts inner-axial surface 64. Sealing is accomplished by the sealing profile threads 10 and 40, by the tapered seat seals 20 and 60 and by the shoulder seals 30 and 70 in addition to the self-energizing seal 50.

As shown in the drawings, the shoulder seal 70 on the female portion 4 is formed by the sloping surface 72 on the terminal end of the tubing which tightly engages the complementary sloping surface 32 on the shoulder seal 30 of the male portion.

Figure 2:
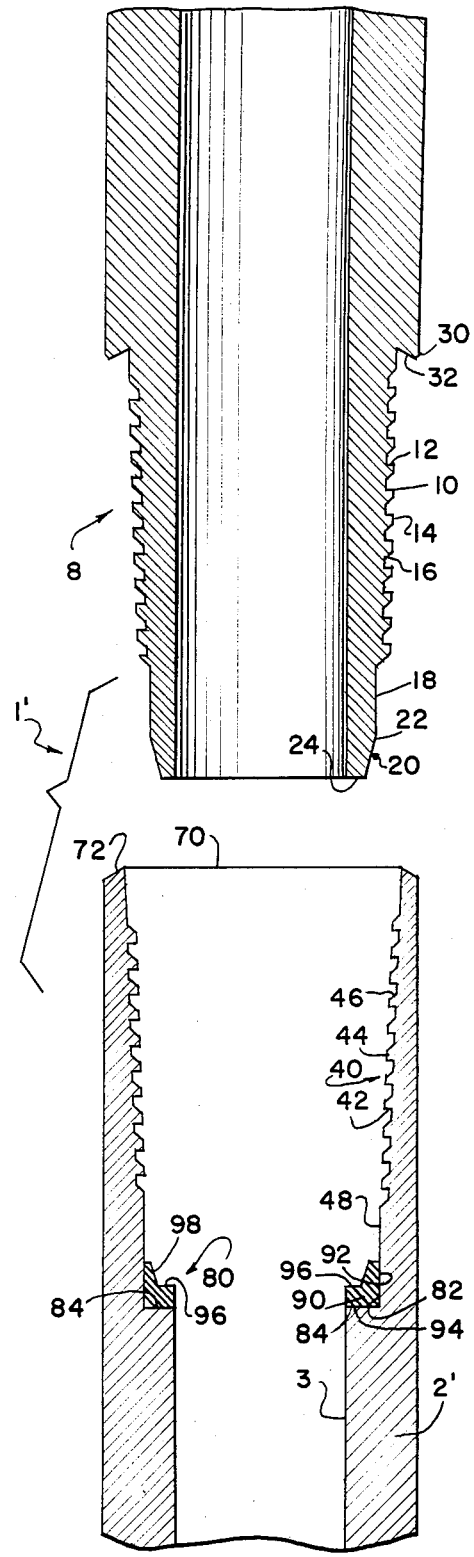
FIG. 2 is a cross-sectional view of a second embodiment of tubing connecting and sealing elements.

A second preferred embodiment of the invention is shown in FIG. 2. Identical reference numerals are used to point out identical parts. In the female portion of the tubing 2' a compression seal and corrosion barrier generally indicated by the numeral 80 is added.

The axial wall 48 is extended by an axial wall 82 which may be slightly radially offset from the axial wall 48. When the axial wall 82 is offset radially outward a slight recess is formed to positionally retain the plastic compression seal.

Axial wall 82 terminates in a radial wall 84. A compression seal 90, which may be made of any suitable resilient and elastomeric or plastic material which is compatible with the material of the tubing and the fluids inside and outside the tubing is positioned in the distal portion of the female part. Axial wall 92 of sealing member 90 lies against axial wall 82 of the tubing. Radial wall 94 of the sealing member 90 lies against the radial wall 84 of the tubing. Axial wall 96 receives the distal end 24 of the male portion. The portion of seal 90 between axial walls 96 and 94 forms an axial compression seal between radial walls 24 and 84. A sloping surface 98 receives the sloping surface 22. A second portion of seal 90 compresses radially outward between walls 22 of the male portion and axial wall 82 of the female portion forming an additional sealing.

The primary sealings of the tubing joint shown in FIG. 2 are the sealing profile threads 10 and 40, the shoulder seals 70 and 30 and the radial and axial seals of the sealing member 90 in cooperation with the tapered seat seal 20.

When the tubings are tightly drawn together by the threads, the multiple seals cooperate with each other to prevent egress or ingress of fluids.

The seal 90 generally eliminates the likelihood of fluid from within the pipe moving outward. Shoulder seals 30 and 70 prevent fluid from migrating inward, and sealing profile threads 10 and 40 prevent movement of fluid in either direc- tion.

In the embodiment shown in FIG. 1, the seal between sloping surfaces 20 and 60 prevents outward flow of fluid, and the compression seal 58 acts as an additional barrier to flow of fluid. Shoulder seals 30 and 70 prevent inward flow of materials, and the sealing profile threads 10 and 40 prevent inter-communication of fluids.

While the invention has been described with reference to specific embodiments, modifications and variations of the embodiments may be constructed without departing from the scope of the invention. The scope of the invention is defined in the following claims.

I claim:

1. Threaded apparatus for interconnection of male and female pipe ends comprising, an outer cylindrical surface and an inner cylindrical surface and a cylindrical wall separating the outer cylindrical surface and the inner cylindrical surface, the cylindrical wall having first and second ends and having first and second end portions extending inward along the cylindrical wall from the first and second ends, the first and second end portions respectively comprising male connection and sealing portions and female connection and sealing portions, the male connection and sealing portion comprising, tapered threads beginning at a position spaced inward from the first end and extending to a second position further spaced inward from the first end, the tapered male threads having a minimum diameter near the first position and maximum diameter near the second position, the tapered threads having generally sloped surfaces on sides thereof facing the first end and having generally radial surfaces on sides thereof facing away from the first end, thereby forming sealing profiles of the first male thread, an axially extending outer surface extending along the tubing from the second position, a shoulder extending outward from the axially extending surface remote from the second position, the shoulder sloping outward and toward the first end for forming one part of a shoulder seal, a second axial surface having a diameter smaller than a diameter of the first axial surface, the second axial surface extending from the first position toward the first end, an outward sloping surface extending from the first end to the second axial surface, wherein the second connection and sealing portion comprise a female connection and sealing portion, the female connection and sealing portion comprising, female thread extending from a third position spaced from the second end to a fourth position further spaced from the second end, the female thread having a maximum dimension near the third position and a minimum dimension near the fourth position, the female threads having sloping surfaces facing the second end and having generally radial surfaces facing away from the second end thereby forming sealing profiles, the male threads and female threads cooperating and fitting together to provide a seal, a third axial surface extending inward from the fourth position away from the second end to an inner shoulder disposed at an innermost position of the female portion, a fourth axial surface extending from the third position toward the second end to a terminal sloping surface at the second end, the terminal sloping surface having a slope for lying against the shoulder on the male portion when the threads are interconnected and tightened and the fourth axial surface overlies the first axial surface, the third axial surface having inner sealing means associated therewith for cooperating with a surface near the first end to provide an additional seal, the inner cylindrical surface extending from the first end to the inner shoulder and the outer cylindrical surface extending from the terminal surface at the second end to the shoulder on the male portion, wherein the third axial surface extends from the fourth position inward to the inner shoulder and wherein the sealing means comprises an annular compression seal having a radial surface for abutting the inner shoulder and having an outer axial surface for lying against the third axial surface, the compression seal having an inner axial portion for receiving the first end of the tubing in sealing relation therewith and having a sloping surface extending from the inner axial surface outward toward the third axial surface for receiving the outward sloping surface at the first end of the tubing in sealing relation therewith whereby the compression seal is compressed axially between the inner shoulder and the first end of the tubing and wherein the compression seal is compressed radially between the outward sloping surface near the first end of the tubing and the third axial surface in the female portion of the tubing.

* * * * *